United States Patent
Zhou et al.

(10) Patent No.: US 11,255,539 B2
(45) Date of Patent: Feb. 22, 2022

(54) GAS BURNER CONTROL BALL VALVE

(71) Applicants: Dongsheng Zhou, Cupertino, CA (US); Bree Hao Peng, Santa Clara, CA (US); Gene Zhou, Cupertino, CA (US)

(72) Inventors: Dongsheng Zhou, Cupertino, CA (US); Bree Hao Peng, Santa Clara, CA (US); Gene Zhou, Cupertino, CA (US)

(*) Notice: Subject to any disclaimer, the term of this patent is extended or adjusted under 35 U.S.C. 154(b) by 33 days.

(21) Appl. No.: 16/926,678

(22) Filed: Jul. 11, 2020

(65) Prior Publication Data
US 2022/0010959 A1  Jan. 13, 2022

(51) Int. Cl.
| F16K 5/00 | (2006.01) |
| F23D 14/82 | (2006.01) |
| F16K 5/06 | (2006.01) |
| F23N 1/00 | (2006.01) |
| F16K 5/12 | (2006.01) |

(52) U.S. Cl.
CPC .......... *F23D 14/825* (2013.01); *F16K 5/0605* (2013.01); *F16K 5/12* (2013.01); *F23N 1/007* (2013.01); *F23N 2235/24* (2020.01)

(58) Field of Classification Search
CPC ........ F23D 14/825; F16K 5/0605; F16K 5/12; F16K 5/103; F16K 5/106
See application file for complete search history.

(56) References Cited

U.S. PATENT DOCUMENTS

| 4,103,868 A * | 8/1978 | Thompson | F16K 5/0605 251/283 |
| 4,881,718 A * | 11/1989 | Champagne | F16K 5/0605 251/209 |
| 5,181,539 A * | 1/1993 | Yokoyama | F16K 5/0605 137/625.32 |
| 5,785,074 A * | 7/1998 | Kieper | F16K 5/0605 137/312 |
| 6,412,756 B1 * | 7/2002 | Hayduk | B01J 8/003 251/315.1 |
| 2003/0205688 A1 * | 11/2003 | Milberger | F16K 31/52425 251/315.01 |
| 2015/0137018 A1 * | 5/2015 | Russell | F16K 31/528 251/252 |
| 2015/0210417 A1 * | 7/2015 | Donati | F16K 5/0605 53/167 |
| 2015/0285383 A1 * | 10/2015 | Stumbo | F16K 24/02 137/1 |
| 2018/0209548 A1 * | 7/2018 | Zens | F16K 5/12 |

* cited by examiner

*Primary Examiner* — Reinaldo Sanchez-Medina (57) ABSTRACT

A control gas ball valve for high pressure gas cooking appliances provides a linear surface slot along its rotation direction. When turned by a control knob and enters a gas inlet, the said surface slot is able to channel gas input to a hole that connects said surface slot to the center of the valve ball. The gas in the center of the valve ball is directed away to a burner for cooking purposes. The said linear surface slot is able to provide constant flowrate slope for continuously variable power adjustment and a maximum power plateau. These are the most desirable features in residential cooking.

3 Claims, 11 Drawing Sheets

SECTION A-A
SCALE 4:1
Fig. 3B

SECTION A-A
SCALE 4:1
Fig. 5B

Fig. 7B
SECTION A-A
SCALE 4:1

SECTION A-A
SCALE 4:1
Fig. 9B

GAS BURNER CONTROL BALL VALVE

BACKGROUND OF THE INVENTION

1. Field of the Invention

The present invention relates to the control ball valve for electronic ignition assembly of an outdoor cook stove burner utilizing high pressure gas fuel, in particular those stove burners for domestic (residential use) or industrial gas cooking using bottled gas (butane or propane).

2. Brief Description of the Prior Art

Before all gas burners generate flame and heat for cooking, the gas fuel and air mixture from a control valve to the burner must be ignited. If the burner relies on a hand held ignition device such as long nose barbecue ignitor, or similar, to ignite, it is considered as a manual ignition stove burner. A hand held ignitor has liquid fuel storage. The storage container is usually transparent such that user can view how much fuel remains in the ignitor. There are one or two valves that connect this fuel storage to a long nose. The reason for the long nose is to avoid injury from fire during and after manual ignition of the stove burner. When the valve(s) are opened to let the fuel from the storage to reach the end of the long nose, the liquid fuel pressure falls greatly and vaporizes. The vapor exits from the tip of the long nose ignitor with a certain speed. This fuel vapor mixes with its surrounding air to form a flammable gaseous mixture.

Hand held manual ignitors provide ignition triggers to ignite the flammable gaseous mixture that is emitted from the tip. The operator shall insert a finger into the trigger ring and pull the ignition trigger. This trigger will pull on a small, spring-loaded internal hammer. At the end of the trigger travel, a mechanism releases this hammer and spring. The spring acts on the hammer unimpeded, accelerating the hammer to a high velocity to impact its original resting position where a piezoelectric striker is located. Struck by this hammer, the piezoelectric striker generates a high voltage. This high voltage is conducted along ignition conductors to the end of the long nose, where an air gap exists between the ignition leads. The high voltage arcs over this small air gap at the tip of the ignition device. As the long nose end is surrounded by flammable gas, the arc generates enough heat to start the flame. The operator can move this flame close to the main stove burner to ignite it.

A manual ignition stove burner does not require a built-in ignition mechanism. Its valves are solely for gas flow control. Adjustable-pressure type manual ignition stove burners have control knobs on a pressure regulator connected between its high pressure source, such as a propane tank, and the stove burner. By varying the regulator pressure, amount of gas reaching the burner is controlled. Fixed-pressure type manual ignition stove burners have a regulator providing a fixed pressure to a set of valves in the stove burner. One valve is used to control amount of gas reaching the main burner while another valve is used to provide a small amount of gas to be burned as a pilot flame. The pilot flame burns much less fuel than the main burner, enabling the main burner to shut down after use but not requiring manual re-ignition if the pilot flame valve is not shut off. The main burner can be re-ignited by the pilot flame.

Manual ignition stove burners are simply constructed, and hence they are robust and reliable. However, having a hand held ignition device adds additional complexity to the operation of the stove. A stove burner can use a valve which integrates this ignition device into the valve assembly. Since the integrated ignition mechanism incorporates a piezoelectric for arc generation, it is considered to be an electronic ignition stove burner.

A simple electronic ignition valve assembly has two separately controlled gas pathways, one for controlling gas flow to the main burner, another releasing a small flow of gas along a separate path for electronic ignition of a pilot flame. Each pathway is controlled by a rotating valve knob. To ignite the pilot flame, the operator will rotate the ignition valve towards its open position to allow gas to flow along the pilot flame tube and exiting via the pilot flame orifice. This gas will mix with the ambient air as it exits the tube to form a flammable gas mixture. As the valve opens, the rotating knob will additionally pull on a small spring loaded internal hammer. When the valve knob is rotated to a certain number of degrees of rotation, typically 90 degrees, the mechanism which pulls on the spring loaded internal hammer will release the hammer and spring. The hammer will then impact its original resting position where a piezoelectric striker is located. Struck by this hammer, the piezoelectric striker generates a high voltage. This high voltage is conducted along ignition conductors to the end of the pilot flame tube, where a small air gap exists between the leads. The high voltage arcs over this small air gap at the tip of the pilot flame tube and ignites the flammable gas mixture to create a pilot flame. This flame is maintained by a continuous low-volume flow of gas along the pilot flame tube and is oriented in such a manner to ignite any flammable gas mixture that exits the main burner.

The operator may now turn the rotating control knob for the main burner valve in order to allow gas to flow to the main burner orifice and exit via the main burner. Venturi effect brings in surrounding air to mix with gas shooting out of the main burner orifice into the main burner. As exiting the main burner, the readily mixed gas air flammable mixture is subsequently ignited by the heat of the pilot flame.

Each of the two valves in this design are independently controlled, allowing their flow to be controlled in a continuously variable manner in most designs, but requires the use of a large gas flow control assembly.

A more advanced version of electronic ignition stove burner combines the above two independent valves into one smaller and more compact unit. The valve's two functions are controlled by a spring-loaded rotating knob which can also be pushed a small distance into the valve body along its axis of rotation. When an operator pushes the knob into the valve body along its axis of rotation, it enables gas to travel through the ignition path along the pilot flame tube and to exit the pilot flame orifice. The knob will then be rotated to its open position, which will gradually allow gas to flow to the main burner near the end of its ignition portion of its rotational travel. The rotating knob will pull on a small spring loaded internal hammer. When the valve knob is rotated to a certain number of degrees of rotation, typically 90 degrees, the mechanism which pulls on the spring loaded internal hammer will release the hammer and spring. The hammer will then impact its original resting position where a piezoelectric striker is located. Struck by this hammer, the piezoelectric striker generates a high voltage. This high voltage is conducted along ignition conductors to the end of the pilot flame tube, where a small air gap exists between the leads. The high voltage arcs over this small air gap at the tip of the pilot flame tube and ignites the flammable gas mixture to create a pilot flame. This flame is maintained by a continuous low-volume flow of gas along the pilot flame tube as long as the rotating knob is pushed into the valve body, and is oriented in such a manner to ignite the flammable gas mixture that exits the main burner. The gas that was allowed to flow to the main burner exits the main burner orifice and mixes with the surrounding air to form a flammable gas mixture. This mixture comes into contact with the pilot flame, igniting it.

At this point in operation, the operator may release the knob, which will spring out of its depressed position, which removes the gas flow to the pilot flame, which is only required for the ignition of the main burner. The remaining rotational travel of the control knob is then available for use to control gas flow rate to the main burner, and subsequently control the heat output of the main burner.

Aforementioned actions to operate the combined ignition valve are required to be synchronized mechanically. One method to achieve the described operation is to implement this valve as a ball valve. The ball valve has a slot which is mated to a hollow rotating shaft. This shaft contains a needle valve and is additionally mated to the rotating control knob. Existing ball valves utilized for these purposes produce only two or three main fixed flow rates, which results in only 2 or 3 perceived flame levels. Although these two or three levels are typically considered sufficient for industrial or commercial use cases of cook stove burners, domestic use cases of outdoor cook stove burners may benefit from a continuously variable flow rate and the resultant continuously variable heat output. It is the objective of this invention to overcome existing arts' limited numbers of perceived power levels in ball valve designs to achieve continuous power flame adjustment utilizing a ball valve.

SUMMARY OF THE INVENTION

The objective of the present invention is to improve the ball valve design for high pressure gas cooking such that continuous gas flowrate and power adjustment is possible. By incorporating, into the design of the ball of the ball valve, a surface slot to channel gas to an inlet hole, the gas flowrate is able to be regulated by variation of the cross sectional area exposed to the gas inlet. Since the cross sectional area varies gradually and linearly with rotation of the ball valve, it is able to provide a continuously variable flow rate. This continuous flow rate can be considered to be more functionally desirable with respect to cook stove burners.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particular figures shown are by way of example and for the purpose of illustrative discussion of the preferred embodiments of the present invention only. They are presented in the cause of providing what is believed to be the most useful and readily understood description of the principles and conceptual aspects of the invention. In this regard, no attempt is made to show structural details of the invention in more detail than is necessary for a fundamental understanding of the invention. The description, together with the drawings, should make it apparent for those skilled in the art how the several forms of the invention may be embodied in practice. In the drawings:

FIG. 3 has 4 separate views of a prior art 2-hole control ball valve.

FIG. 4 shows relevant information to calculate the normalized gas flow rate of the prior art 2-hole control ball valve.

FIG. 5 has 4 separate views of a prior art 3-hole control ball valve.

FIG. 6 shows relevant information to calculate the normalized gas flow rate of the prior art 3-hole control ball valve.

FIG. 7 has 4 separate views of the first preferred embodiment of a control ball valve according to present invention.

FIG. 8 shows relevant information to calculate the normalized gas flow rate of the first preferred embodiment of a control ball valve according to present invention.

FIG. 9 has 4 separate views of the second preferred embodiment of a control ball valve according to present invention.

FIG. 10 shows relevant information to calculate the normalized gas flow rate of the second preferred embodiment of a control ball valve according to present invention.

FIG. 11 shows relevant dimension information to calculate the preferred slot width of a control ball valve according to present invention.

DETAIL DESCRIPTION OF THE PREFERRED EMBODIMENTS

Figure 1:
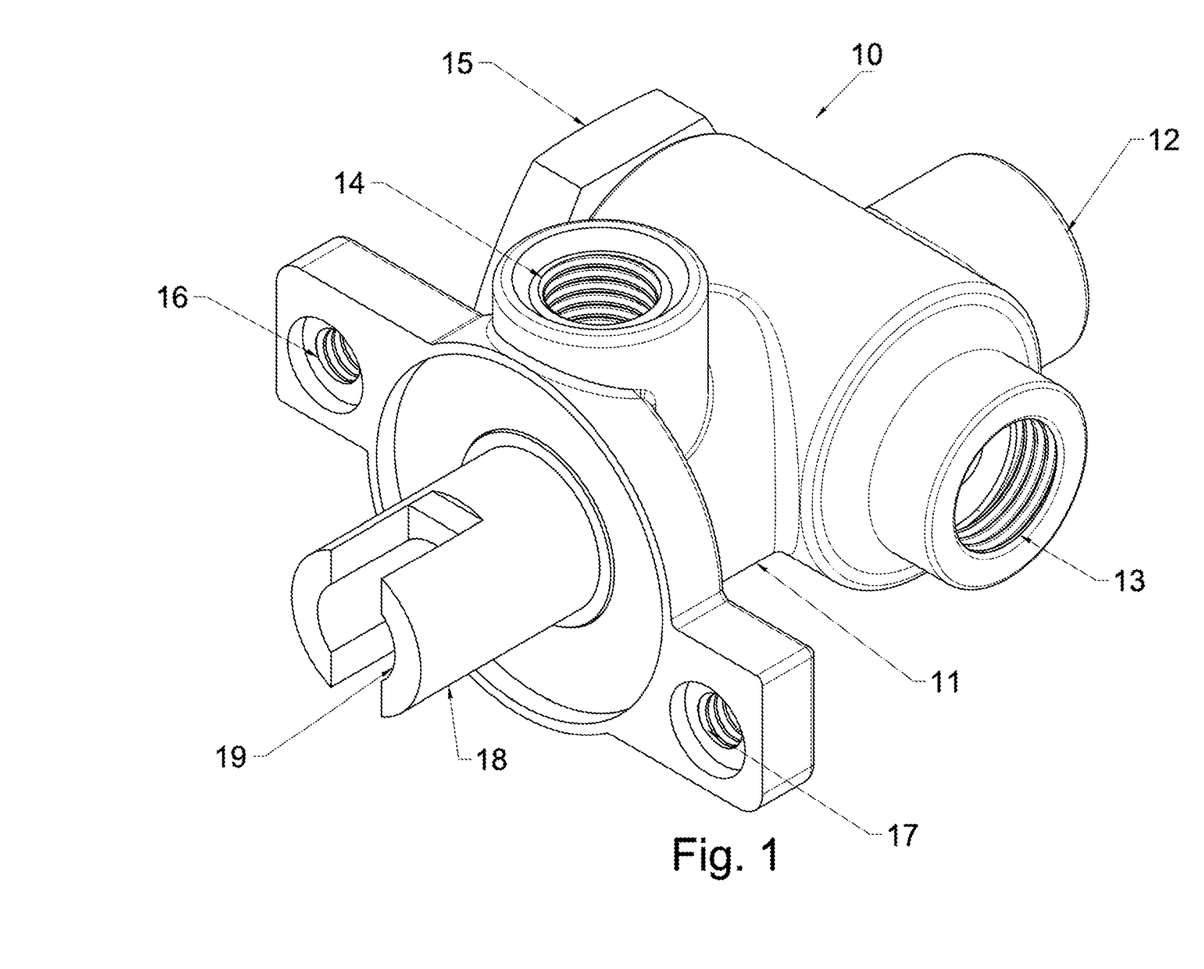
FIG. 1 is a perspective view of a valve body that can accommodate both electronic ignition and flame control from a single knob.

A preferred control ball valve according to the present invention for an electronic ignition valve assembly utilized in a high-pressure gaseous burner is enclosed in a valve body 10 in FIG. 1. Valve body 10 has a threaded inlet 13 where various brass fittings such as flare or hose barb type can be used to connect it to a high-pressure fuel source. Outlet 12 generally connects to an orifice which creates a venturi effect through inlet of the main burner pipe. Outlet 12 is the output of the valve. Hex nut 15 seals off the other side of the valve body 10. Outer body 11 of valve body 10 provides a top outlet 14 for electronic ignition purpose. Front of valve body 10 has two screw holes 16 and 17 ready to accept screws to mount a piezoelectric ignition head. Shaft 18 has a slot 19 ready to accept a knob's push and turn actions.

Figure 2:
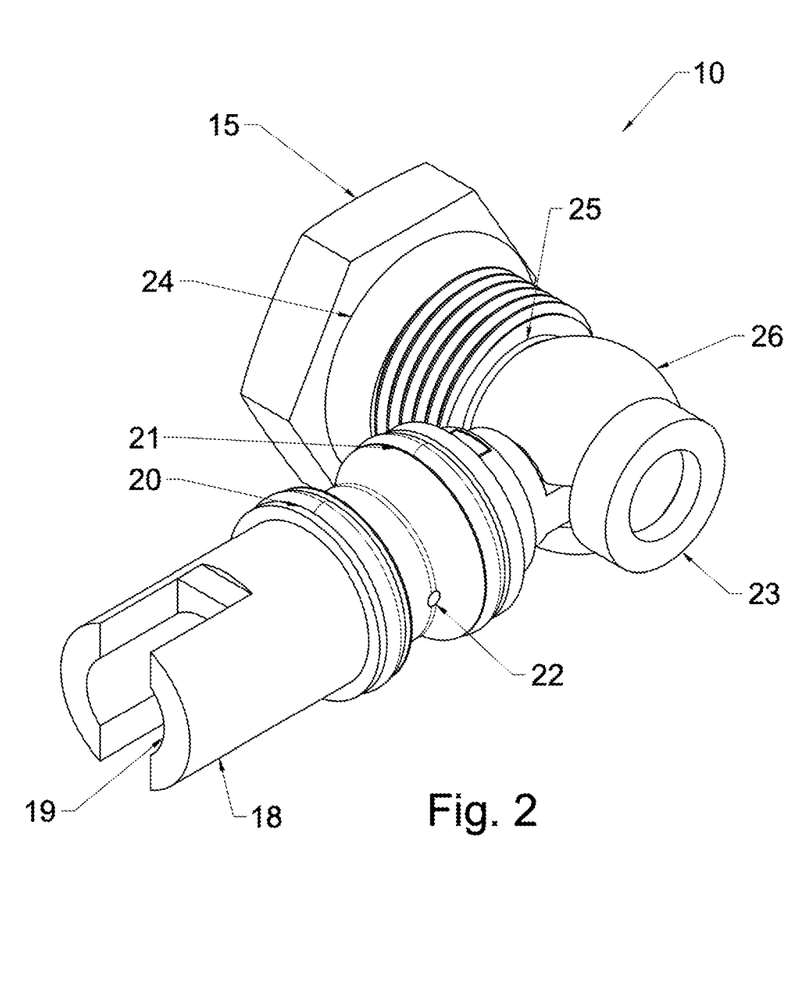
FIG. 2 is a perspective view of the internal components of the valve in FIG. 1 after its outside body is removed.

FIG. 2 is the inside of valve body 10. Rubber rings 21, 24, hex nut 15, inlet 13, outlet 12 together with outer body 11 form a gas chamber. In the center of shaft 18, extending from the slot 19, there is a spring mechanism. When the knob pushes inward, this mechanism opens a path from the gas chamber through hole 22. Gas can fill up the circular slot area between two rubber rings 21 and 20. This gas can exit the ignition outlet 14 to a copper tube for electronic ignition purpose. Plastic washers 23 and 25 allow a prior art ball valve 26 to rotate. Shaft 18 has a protruded head engaged into a mating slot 30 of valve ball 26. When the front knob is turned, it carries shaft 18 and the valve ball 26 counter-clockwise. The knob always turns the shaft 18 with slot 19 away from its original vertical position. During the shaft 18's first 90 degrees turn, shaft 18 also carries a piezoelectric shaft. At around 90 degrees, the piezoelectric shaft is released to strike a piezoelectric material to generate a high voltage at the end of an ignition copper tube. At around 90 degrees, hole 22 reaches the top to line up with the ignition outlet 14 to provide the strongest gas output to the ignition path where the high voltage arrives to generate a spark to ignite the gas which produces a flame travelling toward the main burner.

Figure 3A:
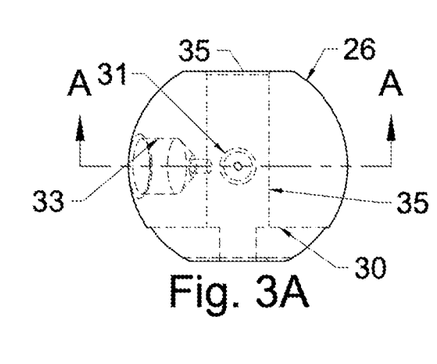
FIG. 3A is a top view of a prior art 2-hole control ball valve.
Figure 3B:
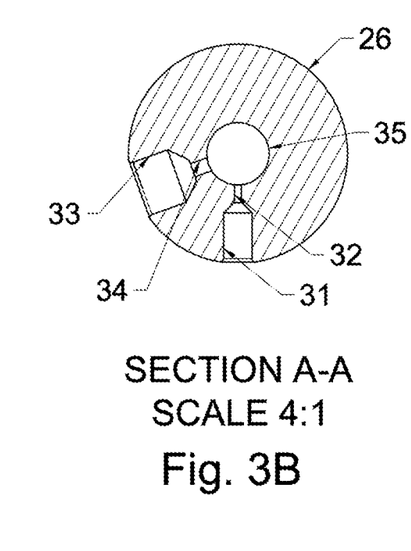
FIG. 3B is the cross-section view of the prior art 2-hole control ball valve in FIG. 3A.
Figure 3C:
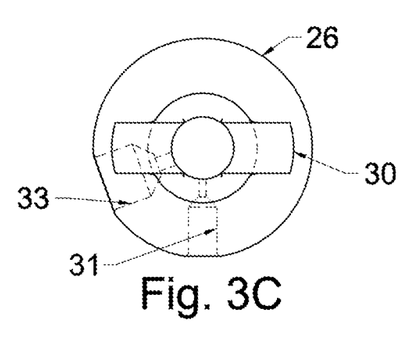
FIG. 3C is the front view of the prior art 2-hole control ball valve in FIG. 3A.
Figure 3D:
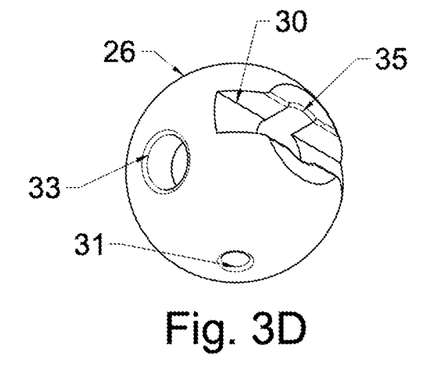
FIG. 3D is the perspective view of the prior art 2-hole control ball valve in FIG. 3A.

The amount or the flow rate of gas passing from the inlet 13 and inlet washer 23 toward outlet 12 is regulated by the knob turning the ball valve 26. FIG. 3 shows the prior art ball valve 26 from various views. FIG. 3A is its top view. FIG. 3B is its cross-section view. FIG. 3C is its front view. FIG. 3D is a perspective view from its left bottom. Ball valve 26 has a slot 30 which mates with the protruded head of shaft 18. Slot 30 is cut on one of two parallel surfaces. Between these two parallel surfaces, a center hole 35 connects the protruded head of shaft 18 to the outlet 12. The protruded head of shaft 18 has a hole which is normally blocked by a spring mechanism inside of shaft 18. This hole can be opened by pressing the knob inward which presses the spring mechanism inward. Gas in ball valve 26 center hole 35 is available to outlet 12 all the time and can be made available to the ignition path if the knob is pressed inward. Ball valve 26 has a small hole 31 on its surface initially positioned vertically at its bottom. A smaller hole 32, its diameter about ¼ to ⅓ of hole 31, connects hole 31 from the ball surface toward ball valve center hole 35. Gas available at ball valve surface of hole 31 is directed toward the center hole 35. Toward its horizontal and left side, ball valve 26 has a bigger hole 33 on its surface, smaller hole 34 connects hole 33 toward center hole 35. Gas available on hole 33 surface is directed toward the center hole 35. Since ball valve 26 uses two holes 31 and 33 on its surface to transfer gas from inlet 13 to outlet 12, we can name this valve as the prior art 2-hole control valve 26.

Figure 4A:
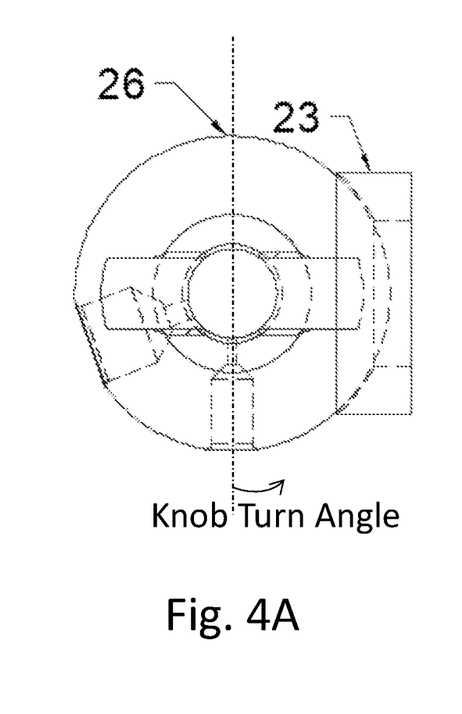
FIG. 4A is the front view of the prior art 2-hole control ball valve in FIG. 3A together with an inlet washer.
Figure 4B:
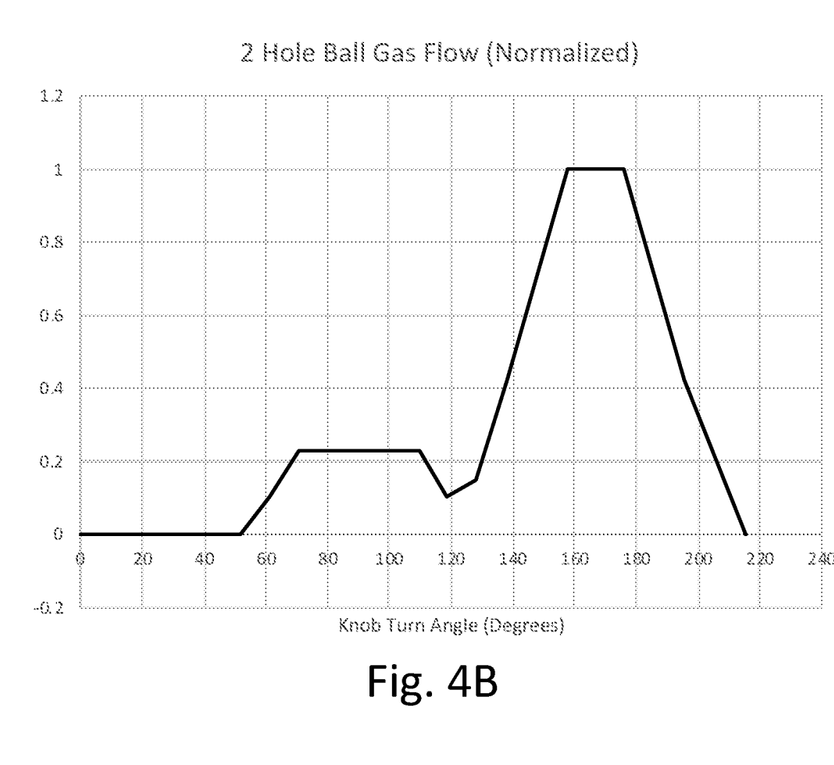
FIG. 4B is the normalized calculated gas flow rate of the prior art 2-hole control ball valve in FIG. 3A.
Figure 5A:
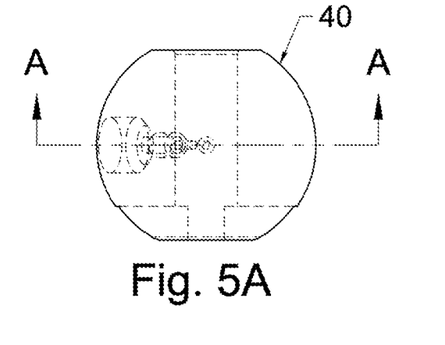
FIG. 5A is a top view of another prior art 3-hole control ball valve.
Figure 5B:
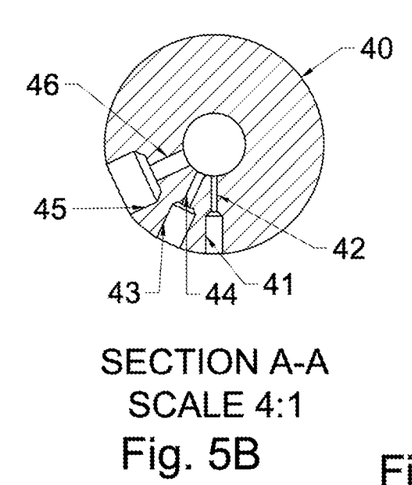
FIG. 5B is the cross-section view of the prior art 3-hole control ball valve in FIG. 5A.
Figure 5C:
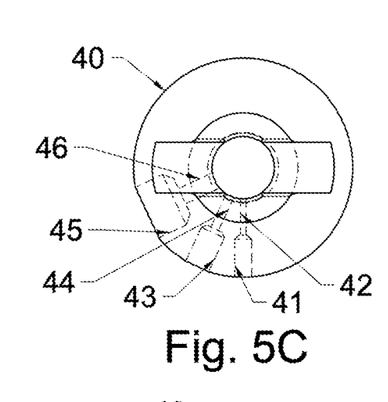
FIG. 5C is the front view of the prior art 3-hole control ball valve in FIG. 5A.
Figure 5D:
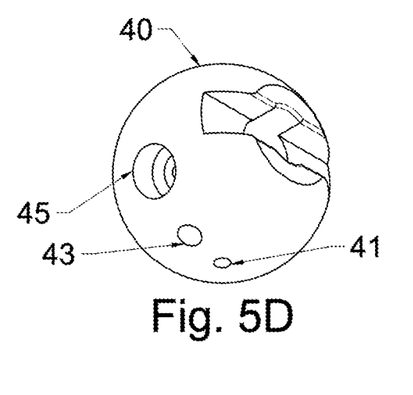
FIG. 5D is the perspective view of the prior art 3-hole control ball valve in FIG. 5A.

FIG. 4 is used to explore calculation of gas flowrate enabled by the prior art 2-hole ball valve 26. FIG. 4A adds the inlet washer 23 to the front view of the ball valve 26. The inner diameter of inlet washer 23 defines the area where the inlet gas is available to the ball valve 26. Initially both holes 31 and 33 do not overlap with Inlet washer inner diameter area, thus there is no gas flow. The gas flowrate is zero. When the knob is turned in counterclockwise for about 50 degrees, hole 31 starts to go into inlet washer 23 inner area. This starts the gas flow toward the outlet 12. With the knob turned further counter-clockwise, the bigger hole 33 starts going into inlet washer 23 inner area, giving more gas to outlet 12. Without getting too much in detail on how flowrate is calculated, we acknowledge that the total overlapping area between holes 31,33 and inlet washer 23 inner area is proportional to gas flowrate. FIG. 4B plots out the normalized flowrate versus knob turn angle. Before 50 degrees, the 2-hole ball valve 26 blocks any gas transfer from inlet 13 to outlet 12. After 50 degrees, hole 31 starts getting into the inlet washer 23 inner area, lifting the gas flow from zero. When hole 31 is fully inside the inlet washer 23 inner area and before hole 33 starts overlapping with inlet washer 23 inner area, a constant flowrate or a plateau is reached. This is about ¼ (25%) of full power. This plateau stretches over 90 degrees where the burner is ignited. This indicates that the burner is set to about ¼ power when ignited. This is quite appropriate. When the knob continues to turn counterclockwise, bigger hole 33 starts to overlap with inlet washer 23 inner area. This starts to increase the flowrate toward full power. A little before 180 degrees, the 2-hole ball valve 26 gives full flowrate gas transfer from inlet 13 to outlet 12. There is a full power plateau. FIG. 4B shows flowrate increases within 20 degrees from zero to $1^{st}$ plateau and within about 30 degrees from $1^{st}$ plateau to $2^{nd}$ plateau. When an operator is turning the knob, it is fairly easy to turn it over 30 degrees and to miss these increasing slopes, resulting in two main power levels mainly perceived.

There is another prior art ball valve 40 in FIG. 5 attempting to improve the discontinuity problem of ball valve 26. FIG. 5A is the top view of ball valve 40. FIG. 5B is a cross-section view of ball valve 40. FIG. 5C is the front view of ball valve 40. FIG. 5D is a perspective view of ball valve 40 from its bottom left side showing three surface holes 41, 43 and 45. Instead of using two holes from the ball surface towards the center, as in ball valve 26, ball valve 40 uses 3 holes from its surface toward its center. On its surface, ball valve 40 has small hole 41, medium hole 43 and big hole 45. Smaller diameter holes 42, 44 and 46 connect holes 41, 43 and 45 from the surface toward a center hole respectively. We call this ball valve as 3-hole control ball valve. The rest of the ball valve 40 is the same as those from ball valve 26.

Figure 6A:
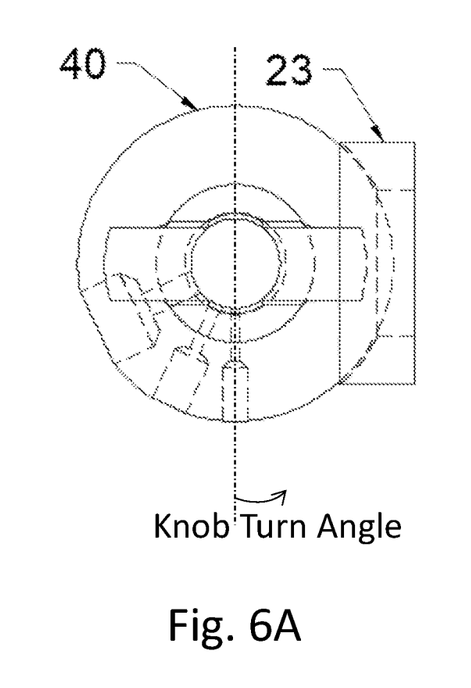
FIG. 6A is the front view of the prior art 3-hole control ball valve in FIG. 5A together with an inlet washer.
Figure 6B:
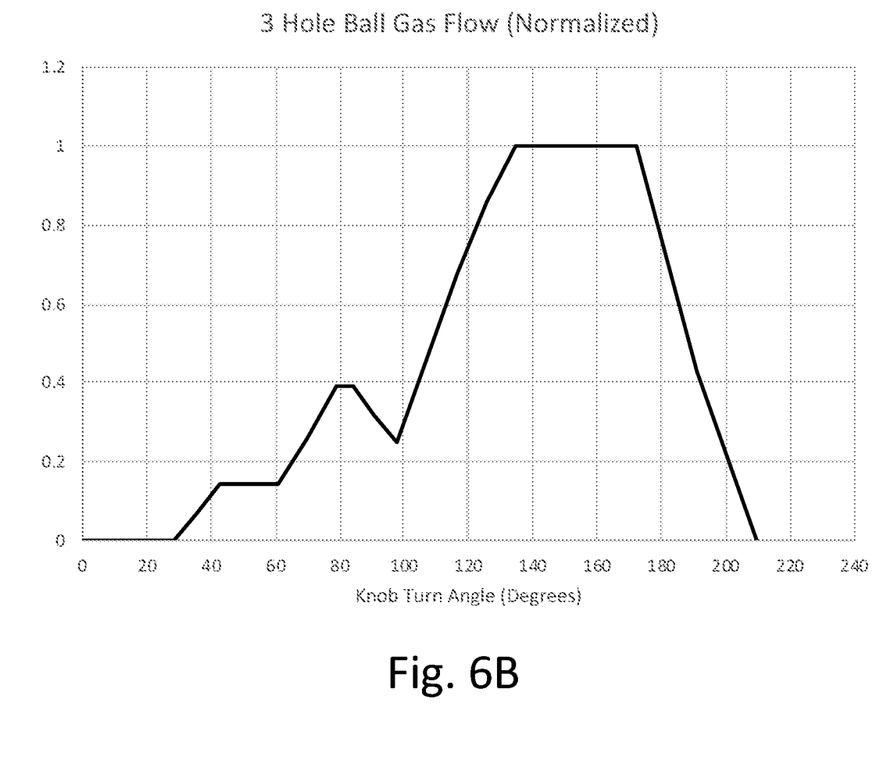
FIG. 6B is the normalized calculated gas flow rate of the prior art 3-hole control ball valve in FIG. 5A.
Figure 7A:
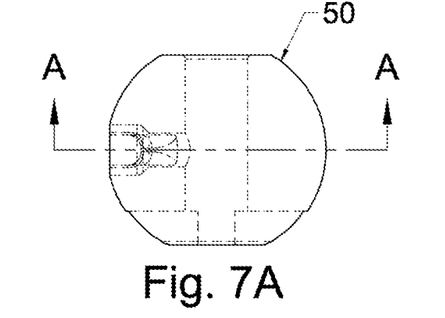
FIG. 7A is a top view of the first preferred embodiment of a control ball valve according to present invention.
Figure 7B:
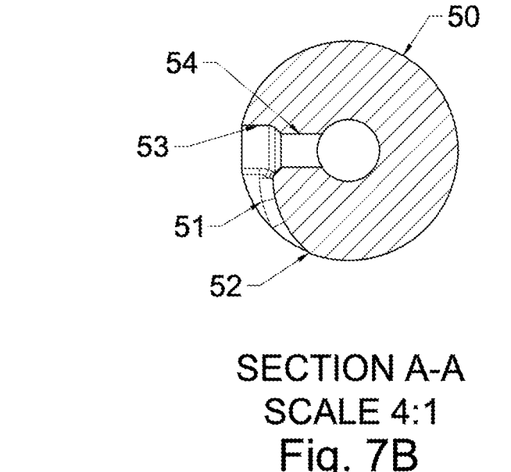
FIG. 7B is the cross-section view of the preferred control valve of present invention in FIG. 7A.
Figure 7C:
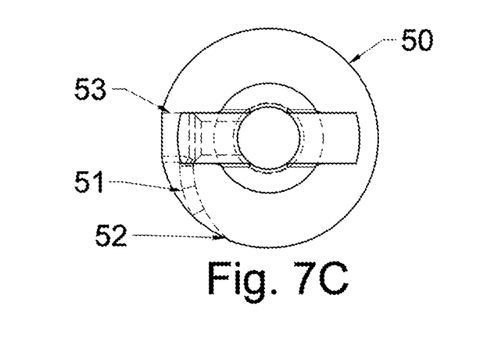
FIG. 7C is the front view of the preferred control valve of present invention in FIG. 7A.
Figure 7D:
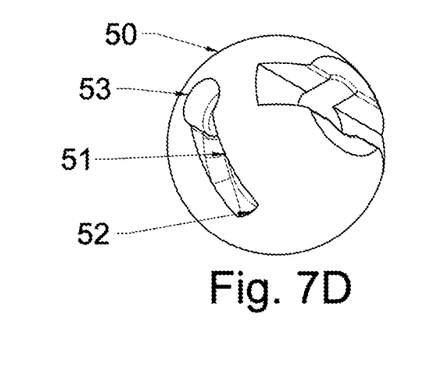
FIG. 7D is the perspective view of the preferred control valve of present invention in FIG. 7A.

FIG. 6 is the calculated flow rate for the prior art ball valve 40. Gas flow starts at 30 degrees. When we remember ignition occurs at approximately 90 degrees, from 30 to 90 degrees is too much a knob travel and allows excess gas flow. At 90 degrees, gas flow rate is around 40%, almost half full power. This is an excessive power level at ignition. In addition to the 40% flow rate at ignition, a small plateau of 10% flow rate between 40~60 degrees and a full flow rate plateau between 130~170 degrees give 3 main settings. Besides the premature gas flow and excessive ignition power level, gas flow adjustment from ball valve 40 is still not smooth. Because of the shortened range of each plateau, it is hard for an operator to precisely arrive at each of these 3 levels.

Hence there is a need to improve the ball valve to provide smooth adjustment of flow rate for continuous power flame adjustment.

FIG. 7 shows one preferred embodiment of the present invention for an improved version of the ball valve 50. FIG. 7A shows the top view of the preferred ball valve 50. FIG. 7B is a cross-section view of ball valve 50. FIG. 7C is the front view of ball valve 50. FIG. 7D is a perspective view of ball valve 50 from its bottom left side illustrating its continuous surface slot ending with a hole toward the ball valve center. The preferred ball valve 50 has a surface slot 51 with a starting point 52. Point 52 is preferred to start slightly after 90 degrees. In other words, it is preferred a bit to the left side from the ball's bottom. Slot 51 continues with same width until a hole 53. Hole 53 is placed horizontally initially and may have a diameter different from slot 51's width. Hole 53 connects to the ball center. The rest of the ball valve 50 is the same as those of ball valve 26.

Figure 8A:
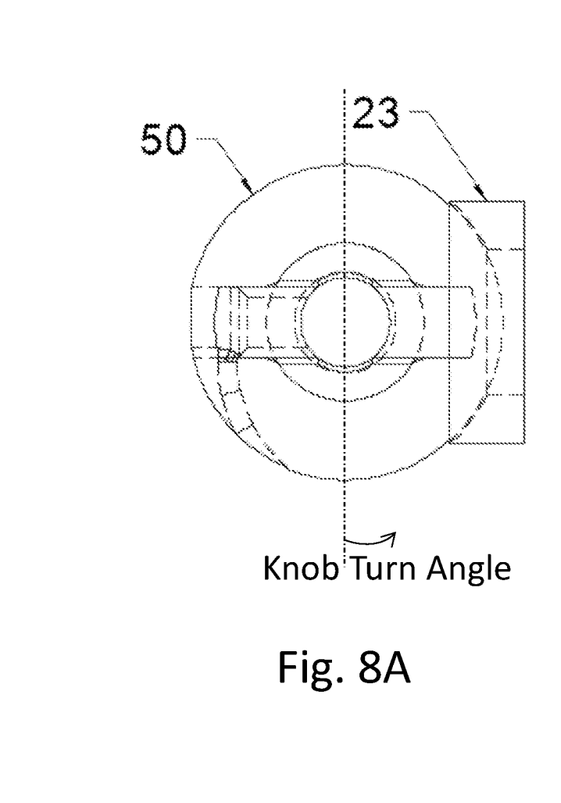
FIG. 8A is the front view of the preferred control ball valve in FIG. 7A together with an inlet washer.
Figure 8B:
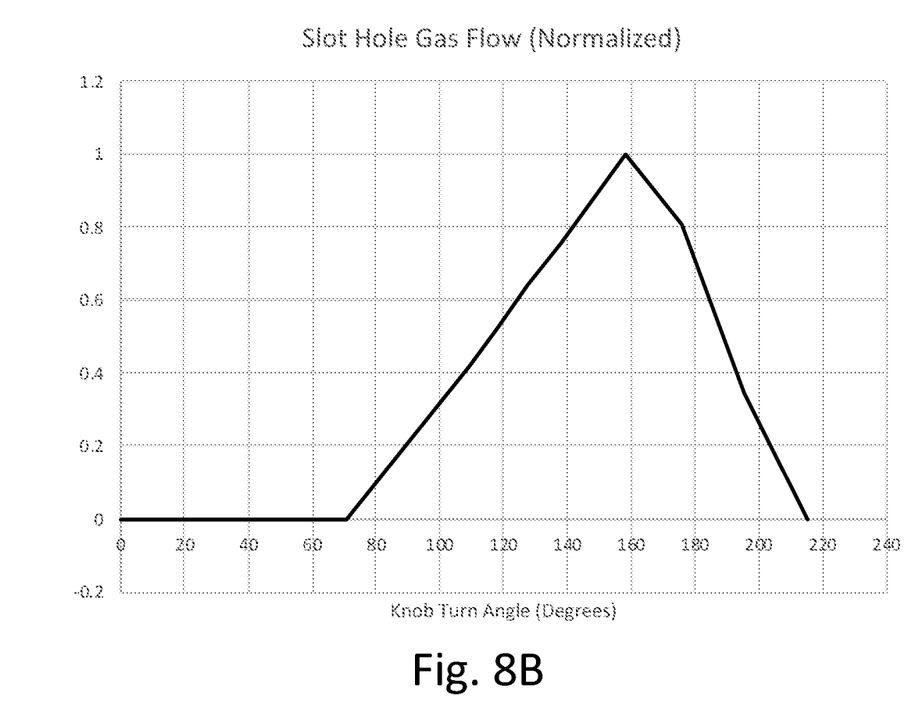
FIG. 8B is the normalized calculated gas flow rate of the preferred control ball valve in FIG. 7A.
Figure 9A:
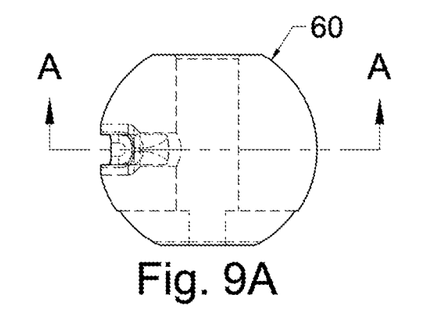
FIG. 9A is a top view of the second preferred embodiment of a control ball valve according to present invention.
Figure 9B:
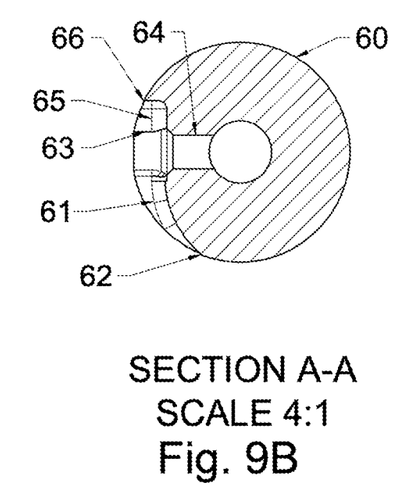
FIG. 9B is the cross-section view of the preferred control ball valve of present invention in FIG. 9A.
Figure 9C:
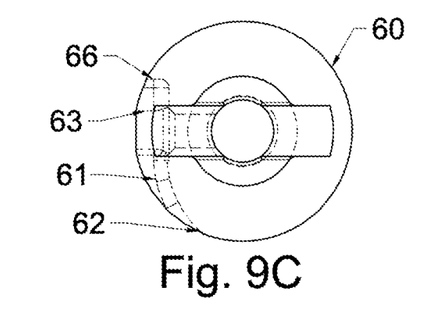
FIG. 9C is the front view of the preferred control ball valve of the present invention in FIG. 9A.
Figure 9D:
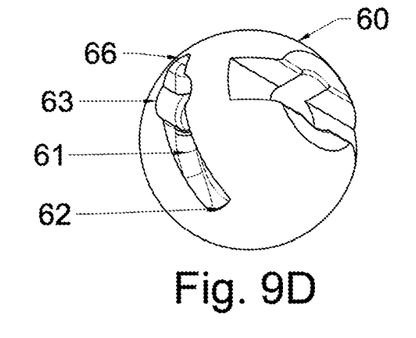
FIG. 9D is the perspective view of the preferred control ball valve of present invention in FIG. 9A.

FIG. 8 is the calculated flowrate for the preferred ball valve 50. FIG. 8A adds inlet washer 23 to help defining when it overlaps with the slot 51 and hole 53. FIG. 8B is the normalized flowrate plot for the preferred ball valve 50. Starting point 52 of slot 51 is placed a bit behind 90 degrees to give a flowrate of 20%~25% at 90 degrees. Continuous constant flowrate slope is achievable from 70~160 degrees. This is the area where power flame is continuously adjustable. Continuous power flame adjustment feature is desirable during cooking. Maximum flowrate is achieved at around 160 degrees before it decreases.

FIG. 9 shows another preferred embodiment of the present invention for an improved version of the ball valve 60. FIG. 9A shows the top view of the preferred ball valve 60. FIG. 9B is a cross-section view of ball valve 60. FIG. 9C is the front view of ball valve 60. FIG. 9D is a perspective view of ball valve 60 from its bottom left side illustrating its continuous surface slot 61 running through a hole 63 toward the ball valve center and continuing as slot 65 after the hole for a certain length. The preferred ball valve 60 has a surface slot 61 with a starting point 62. Point 62 is preferred to start slightly after 90 degrees. In other words, it is preferred that the starting point is slightly to the left side from the ball's bottom when the valve is closed. Slot 61 continues with same width until hole 63. Hole 63 is placed horizontally initially and may have a diameter different from slot 61's width. Hole 63 connects to the ball center. After the hole 63, there is another slot 65 with its end point 66. Slot 65 does not need to have the same width as slot 61. However they are preferred to be the same for simplicity. The rest of the ball valve 60 is the same as those of ball valve 26.

Figure 10A:
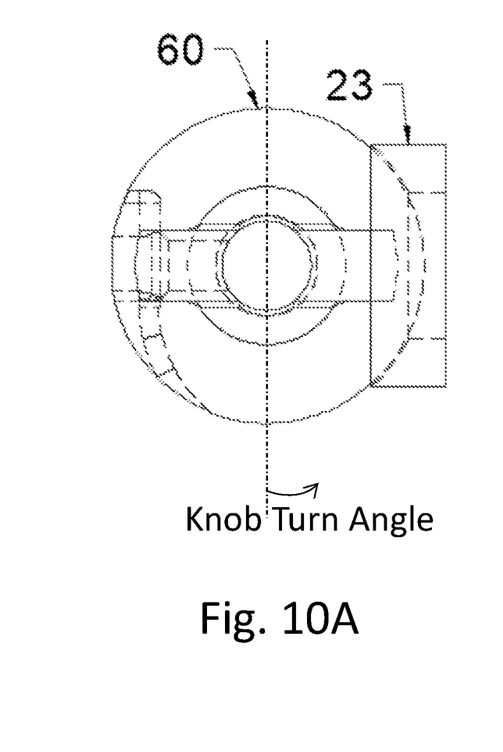
FIG. 10A is the front view of the preferred control ball valve in FIG. 9A together with an inlet washer.
Figure 10B:
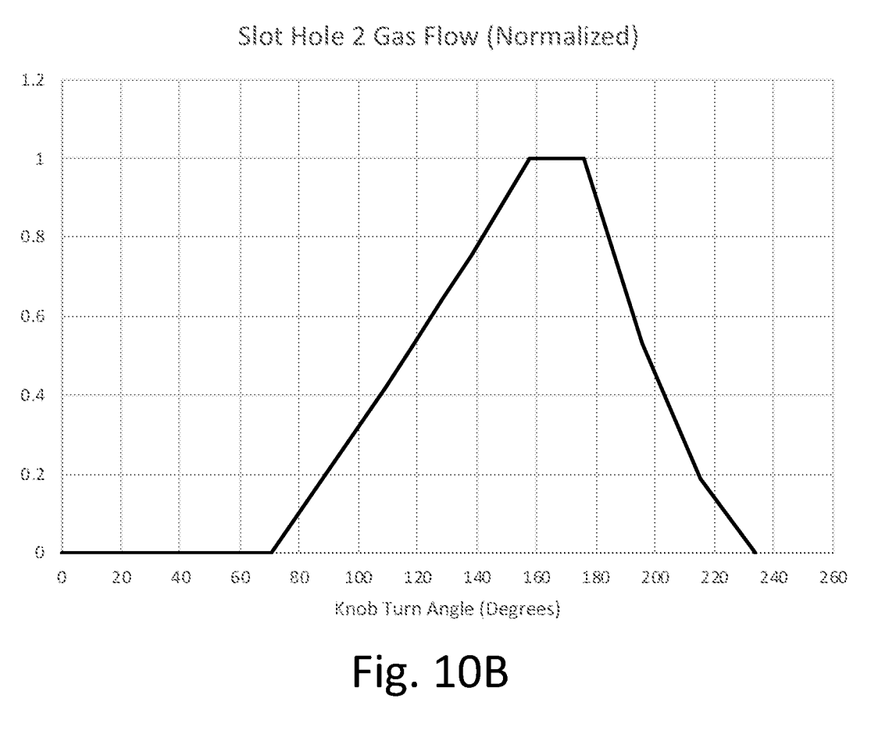
FIG. 10B is the normalized calculated gas flow rate of the preferred control ball valve in FIG. 9A.

FIG. 10 shows the calculated flowrate for the preferred ball valve 60. FIG. 10A adds inlet washer 23 to help defining when it overlaps with the slot 61 and hole 63. FIG. 10B is the normalized flowrate plot for the preferred ball valve 60. Starting point 62 of slot 61 is placed a bit behind 90 degrees to give a flowrate of 20%~25% at 90 degrees. Continuous constant slope of flowrate is achievable from 70~160 degrees. This is the area where power flame is continuously adjustable. From 160 to about 180 degrees, the flowrate maxes out as full power. After about 180 degrees, the flowrate and power start to drop. The feature of Continuously variable flame power adjustment and a short period of maximum power at the end of the control travel are desirable for the purpose of cooking. Slot 65 on top of hole 63 enables the maximum power plateau flow section. Maximum flowrate is achieved at around 160 degrees to around 180 degrees before it decreases.

Figure 11A:
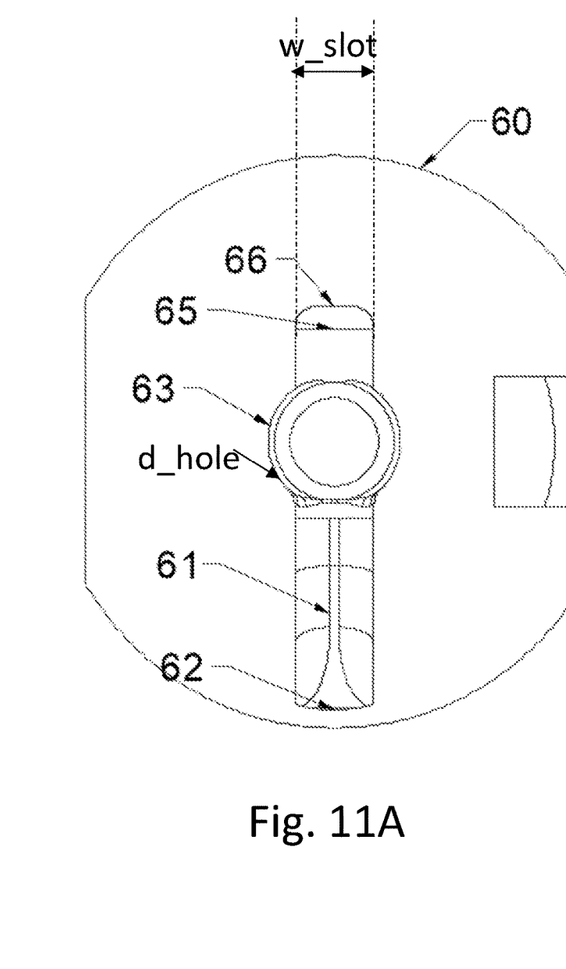
FIG. 11A is the left view of the preferred control ball valve in FIG. 9A with dimension annotation.
Figure 11B:
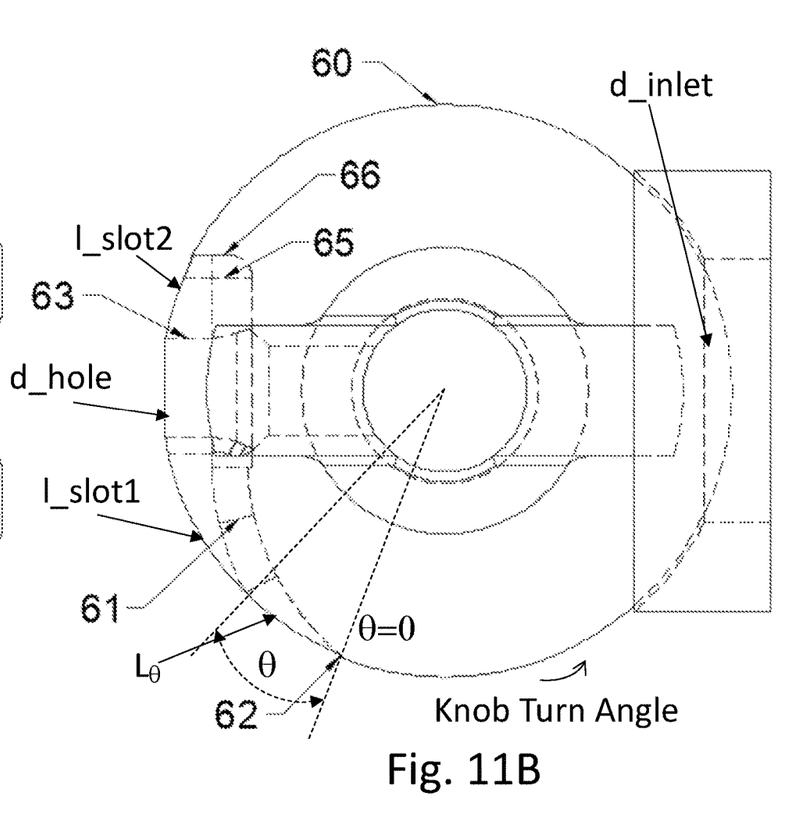
FIG. 11B is the front view of the preferred control ball valve in FIG. 9A together with an inlet washer with dimension annotation.

As mentioned earlier, both preferred embodiments 50 and 60 of the ball valve are capable of achieving constant flowrate slope from around 70 degrees to 160 degrees of the knob turn angle. FIG. 11 uses one preferred ball valve 60 as an example and defines necessary variables to derive this constant flowrate slope to help designing the width of slots 61 and 65. When a constant flowrate slope is achieved for the entire knob travel from beginning point 62 of slot 61 to the end point 66 of slot 65, the slot width has a fixed relationship with respect to the diameter of hole 63, length of slot 61 and inner diameter of inlet washer 23. Similar process should be able to apply to the other preferred ball valve 50. FIG. 11A shows the left view of 60. The diameter of hole 63 is d_hole while the width of the slots 61 and 65 is w_slot. FIG. 11B shows the front view of ball valve 60 along with the inlet washer 23. On the ball valve surface slot 61 has a length l_slot1 below hole 63. Slot 65 has surface length l_slot2 above hole 63. Washer 23 has an inner diameter d_inlet where gas comes in.

When the beginning point 62 of slot 61 starts to get into the inner diameter area of inlet washer 23, gas flowrate starts to have non-zero value. To simplify flowrate slope derivation, we can conveniently define knob turn angle 0=0 at this beginning point 62. A distance of Lo is travelled when the knob is turned 0 degrees. Slope of the flowrate is defined as the flowrate divided by knob travel angle.

$$\text{Slope of Flowrate} = \frac{\text{Flowrate}}{\theta}$$

It is common knowledge that a circle arc distance is its corresponding angle multiplied by its radius. Without getting into too much of flowrate equation, we know that flowrate is proportional to the intersect area between the slot 61, hole 63 and slot 65 with inner diameter area of inlet washer 23.

$$\text{Slope of Flowrate} \propto \frac{\text{Intersect area between slot 61, hole 63 and slot 65 with inner diameter of inlet washer 23}}{L_\theta}$$

After point 62 gets into inner diameter area of 23 and before hole 63 enters, the intersect area of slot 61 and inner diameter area of 23 is $L_\theta \text{w\_slot}$.

$$\text{Slope of Flowrate} \propto \frac{L_\theta \text{w\_slot}}{L_\theta} = \text{w\_slot}$$

As the knob continues to turn and the entire hole 63 just gets into the inner diameter area of 23, the length of slot 61 still remains within 23 is (d_inlet−d_hole). The entire intersect area should be the slot area with this length (d_inlet−d_hole) plus the hole 63 surface area. The travel length should be (l_slot1+d_hole).

$$\text{Slope of Flowrate} \propto \frac{w\_slot(d\_inlet - d\_hole) + \frac{\pi d\_hole^2}{4}}{l\_slot1 + d\_hole}$$

Since we desire constant slope of flowrate throughout the knob travel, we force above two slopes of flowrate to equal such that we can solve for the design variable w_slot.

$$w_{slot} = \frac{\pi d\_hole^2}{4(l\_slot1 + 2d\_hole + d\_inlet)}$$

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive. The scope of the invention will be indicated by the appended claims rather than by the foregoing description. And all changes, which come within the meaning and range of equivalency of the claims, are therefore intended to be embraced therein.

What is claimed is:

1. A ball valve for controlling gas flow for a cooking appliance comprising: a center hole drilled through the center to direct gas out to a burner and an ignition path, a cut slot on one end of said center hole to mate with a turning shaft such the ball valve can be rotated along a rotation direction, a surface slot on the ball along said rotation direction, a path hole in a path of the said surface slot, said path hole is drilled between said surface slot to said center hole, whereby said path hole collects gas coming from said surface slot to said center hole to said burner such that a flowrate of said gas to said burner is continuously adjustable.

2. The ball valve of claim 1, said surface slot width is designed to achieve a constant flowrate slope.

3. The ball valve of claim 1, the locations of said surface slot and said path hole can be adjusted to provide a maximum flowrate.

* * * * *